United States Patent
Lu et al.

(10) Patent No.: US 9,300,874 B1
(45) Date of Patent: Mar. 29, 2016

(54) LENS ACTUATING MODULE

(71) Applicant: LARGAN PRECISION CO., LTD., Taichung (TW)

(72) Inventors: Chun-Yi Lu, Taichung (TW); Te-Sheng Tseng, Taichung (TW); Wen-Hung Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/606,082

(22) Filed: Jan. 27, 2015

(30) Foreign Application Priority Data

Dec. 2, 2014 (TW) .............................. 103221334 U

(51) Int. Cl.
*H04N 5/225* (2006.01)
*H04N 5/232* (2006.01)

(52) U.S. Cl.
CPC ......... *H04N 5/23287* (2013.01); *H04N 5/2254* (2013.01)

(58) Field of Classification Search
CPC .......................... H04N 5/23287; H04N 5/2254
USPC .................................. 348/335, 340, 360, 361
See application file for complete search history.

(56) References Cited

U.S. PATENT DOCUMENTS

| 2010/0039553 | A1* | 2/2010 | Kim ...................... H04N 5/2257 348/374 |
| 2010/0328516 | A1* | 12/2010 | Yamashita ............... G02B 7/08 348/335 |
| 2012/0154614 | A1* | 6/2012 | Moriya .................... G03B 3/10 348/208.5 |
| 2013/0027600 | A1* | 1/2013 | Pavithran ............. H04N 5/2171 348/335 |

* cited by examiner

*Primary Examiner* — Tuan Ho
*Assistant Examiner* — Zhenzhen Wu
(74) *Attorney, Agent, or Firm* — McClure, Qualey & Rodack, LLP

(57) ABSTRACT

A lens actuating module includes a holder, a cover, a lens and a lens actuator. The holder includes an opening hole and at least three first connecting portions. The cover is coupled to the holder and includes a through hole correspondent to the opening hole. The lens with an optical axis is correspondent to the through hole. The lens actuator is movably disposed in the cover and includes at least one elastic member and at least three suspension wires. The elastic member includes at least three second connecting portions. A longitudinal direction of each of the suspension wires is parallel to the optical axis. Two ends of each of the suspension wires are fixedly connected with one of the first connecting portions and one of the second connecting portions, respectively. More than 95% of each of the suspension wires along the longitudinal direction has a rectangular cross-section.

19 Claims, 20 Drawing Sheets

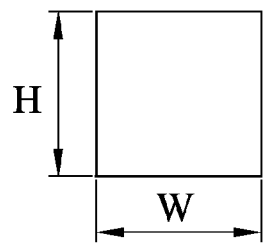
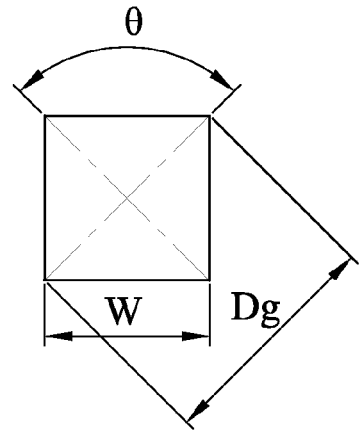
Fig. 9A          Fig. 9B
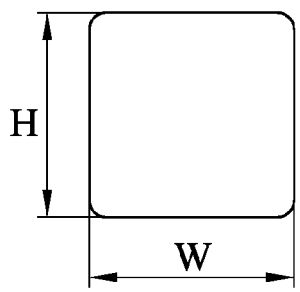
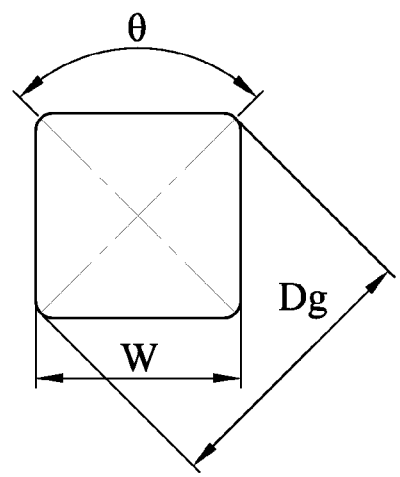
Fig. 10A          Fig. 10B

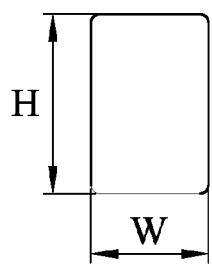
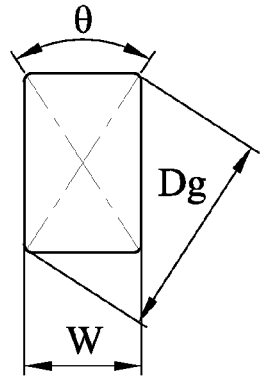
Fig. 11A                    Fig. 11B
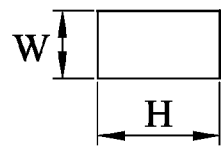
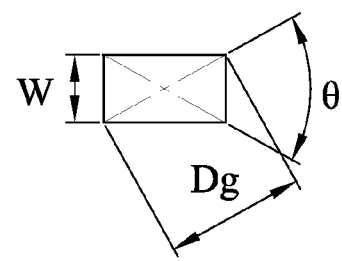
Fig. 12A                    Fig. 12B

LENS ACTUATING MODULE

RELATED APPLICATIONS

This application claims priority to Taiwan Application Serial Number 103221334, filed Dec. 2, 2014, which is herein incorporated by reference.

BACKGROUND

1. Technical Field

The present disclosure relates to a lens actuating module. More particularly, the present disclosure relates to a lens actuating module applicable to mobile terminals.

2. Description of Related Art

In recent years, with the popularity of mobile terminals having camera function, there is an increasing demand for mobile terminals featuring better image quality. When a user uses the mobile terminals for capturing images, a blurry image may be obtained due to hand tremor. For providing a better image quality, applying a lens actuating module with an optical image stabilization function to the mobile terminals is increasingly popular.

Nowadays the lens actuating module with the optical image stabilization function usually includes metal suspension wires for allowing a lens to move along a direction orthogonal to an optical axis. A cross-section of the metal suspension wire orthogonal to the optical axis is typically formed in a circular shape for manufacturing convenience. However, the metal suspension wire with a circular cross-section is unsuitable for automated assembly. For example, during the automated assembly process, an automatic equipment often moves components by gripping. When the cross-section of the metal suspension wire is formed in a circular shape, the contact area between the automatic equipment and the metal suspension wire is excessively small, so that a probability of the metal suspension wire slipping away from the automatic equipment is increased. Furthermore, a size of the circular cross-section of the metal suspension wire is reduced in response to the miniaturization of the lens actuating module. The size of the circular cross-section of the metal suspension wire may be even thinner than that of a human hair, which limits the method of automated assembly. Moreover, the finished assembly may have the problem of module tilt due to different assembling heights of the metal suspension wires. When the lens is driven by the lens actuating module to move along the optical axis, it is difficult to maintain the collimation accuracy. Accordingly, the assembling yield rate of the lens actuating module is suppressed.

To sum up, in the market of mobile terminals, there is a need for a lens actuating module with the optical image stabilization function, which can facilitate the automated assembly and the assembling yield rate thereof can be enhanced.

SUMMARY

According to one aspect of the present disclosure, a lens actuating module includes a holder, a cover, a lens and a lens actuator. The holder includes an opening hole and at least three first connecting portions. The first connecting portions are made of metal material. The first connecting portions are disposed around the opening hole and separated with each other. The cover is coupled to the holder. The cover is made of metal material and includes a through hole correspondent to the opening hole of the holder. The lens with an optical axis is correspondent to the through hole of the cover. The lens actuator is movably disposed in the cover. The lens actuator includes at least one elastic member and at least three suspension wires. The elastic member is disposed around the lens and includes at least three second connecting portions. The suspension wires are made of metal material. A longitudinal direction of each of the suspension wires is parallel to the optical axis of the lens. An end of each of the suspension wires is fixedly connected with one of the first connecting portions, and the other end of each of the suspension wires is fixedly connected with one of the second connecting portions. More than 95% of each of the suspension wires along the longitudinal direction has a rectangular cross-section. The rectangular cross-section is orthogonal to the optical axis of the lens. When a width of the rectangular cross-section is W, and a length of the rectangular cross-section is H, the following relationship is satisfied:

$$0.54 < W/H < 1.85.$$

BRIEF DESCRIPTION OF THE DRAWINGS

The disclosure can be more fully understood by reading the following detailed description of the embodiments, with reference made to the accompanying drawings as follows:

FIG. 9A is a schematic view showing the parameters W and H of a lens actuating module according to the 2nd embodiment of the present disclosure;

FIG. 9B is a schematic view showing the parameters W, θ and Dg of the lens actuating module according to the 2nd embodiment of the present disclosure;

FIG. 10A is a schematic view showing the parameters W and H of a lens actuating module according to the 3rd embodiment of the present disclosure;

FIG. 10B is a schematic view showing the parameters W, θ and Dg of the lens actuating module according to the 3rd embodiment of the present disclosure;

FIG. 11A is a schematic view showing the parameters W and H of a lens actuating module according to the 4th embodiment of the present disclosure;

FIG. 11B is a schematic view showing the parameters W, θ and Dg of the lens actuating module according to the 4th embodiment of the present disclosure;

FIG. 12A is a schematic view showing the parameters W and H of a lens actuating module according to the 5th embodiment of the present disclosure;

FIG. 12B is a schematic view showing the parameters W, θ and Dg of the lens actuating module according to the 5th embodiment of the present disclosure;

DETAILED DESCRIPTION

Figure 1:
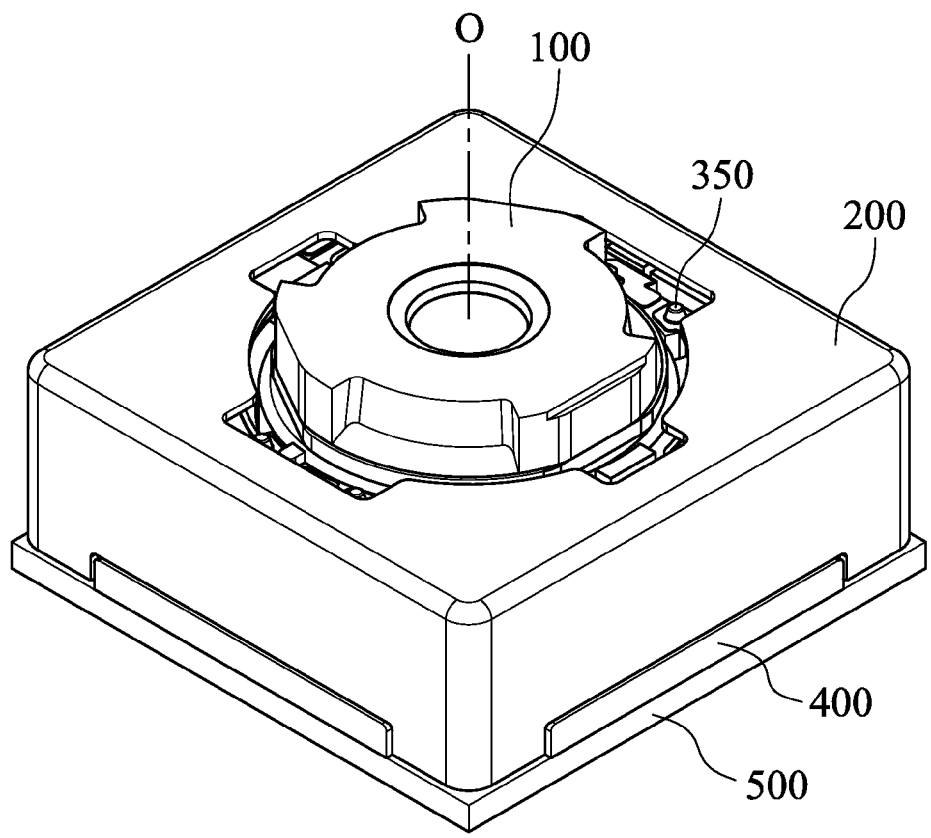
FIG. 1 is an external schematic view of a lens actuating module according to the 1st embodiment of the present disclosure.
Figure 2:
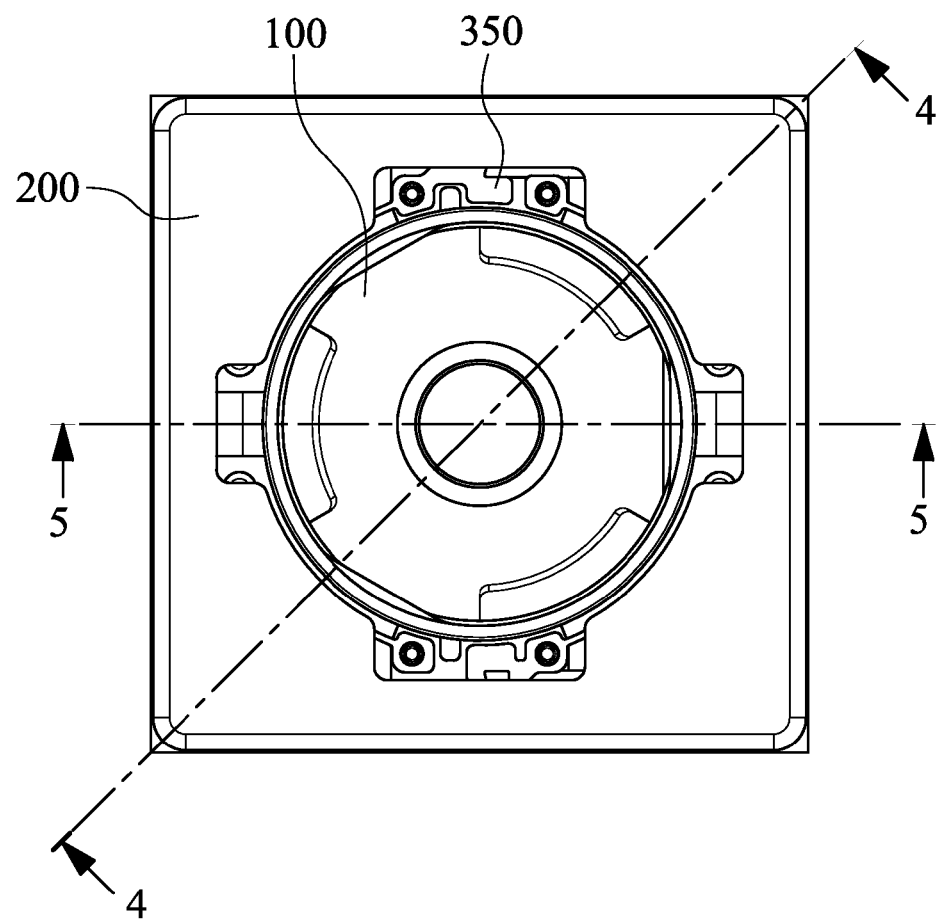
FIG. 2 is a top view of the lens actuating module shown in FIG. 1.
Figure 3:
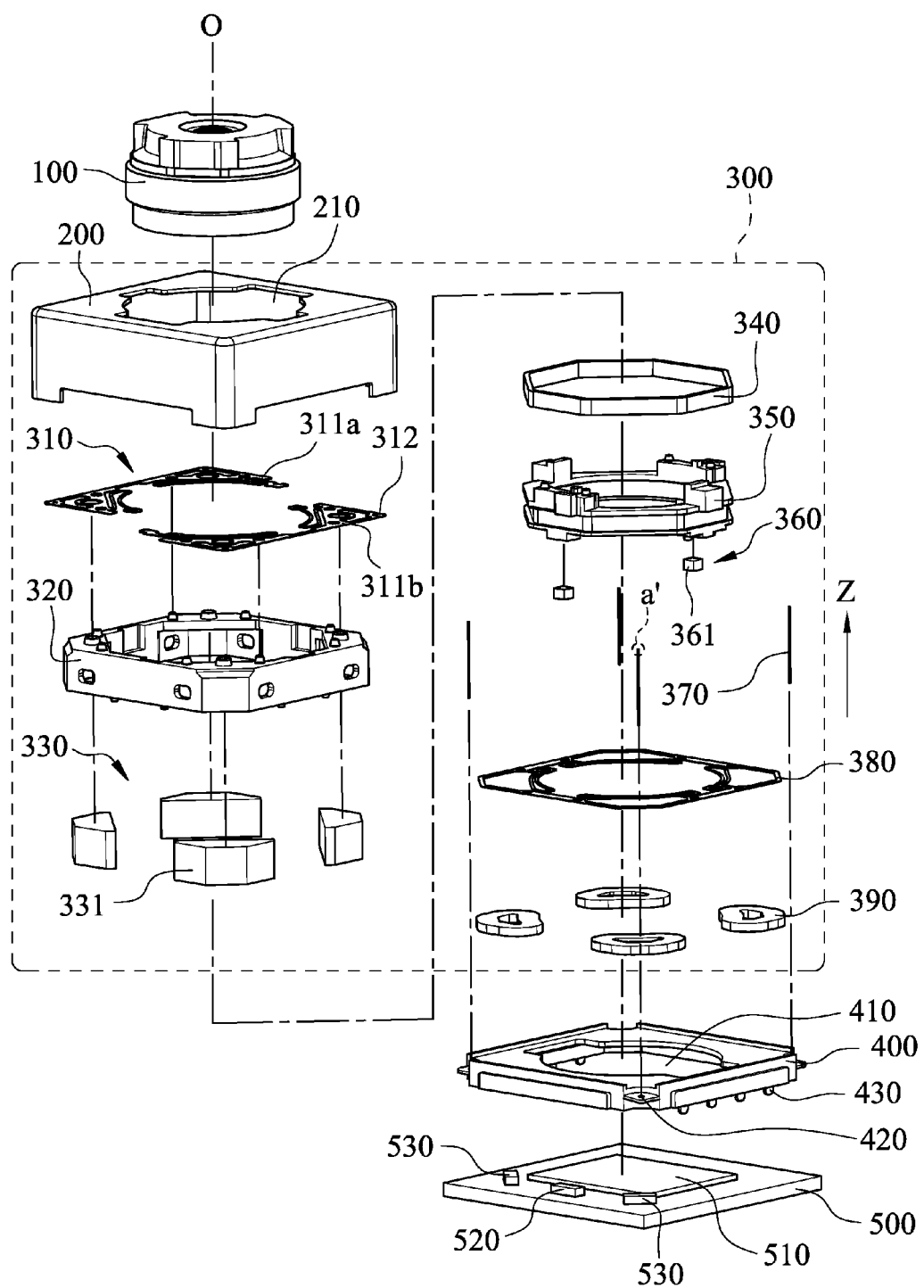
FIG. 3 is an exploded view of the lens actuating module shown in FIG. 1.
Figure 4:
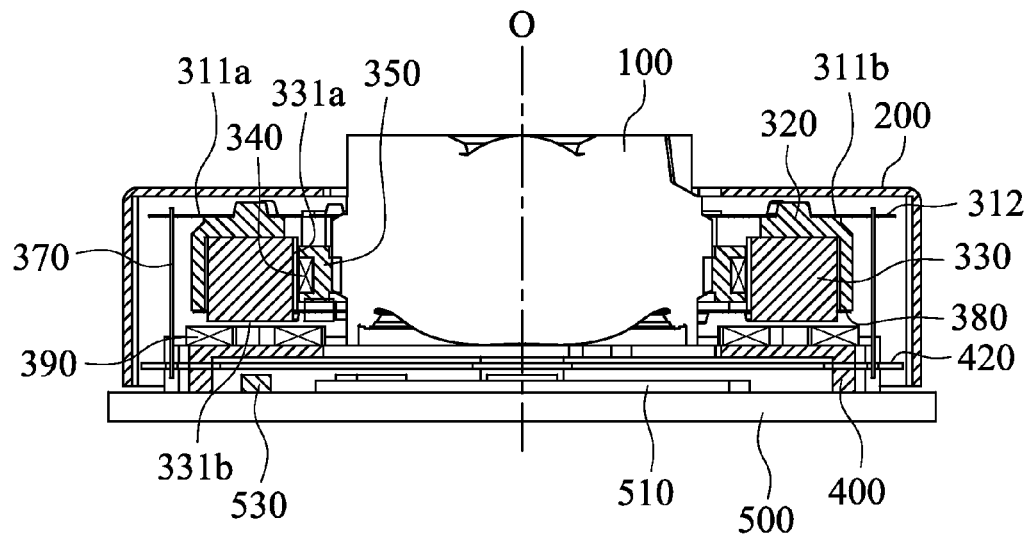
FIG. 4 is a cross-sectional view taken along line 4-4 of the lens actuating module shown in FIG. 2.
Figure 5:
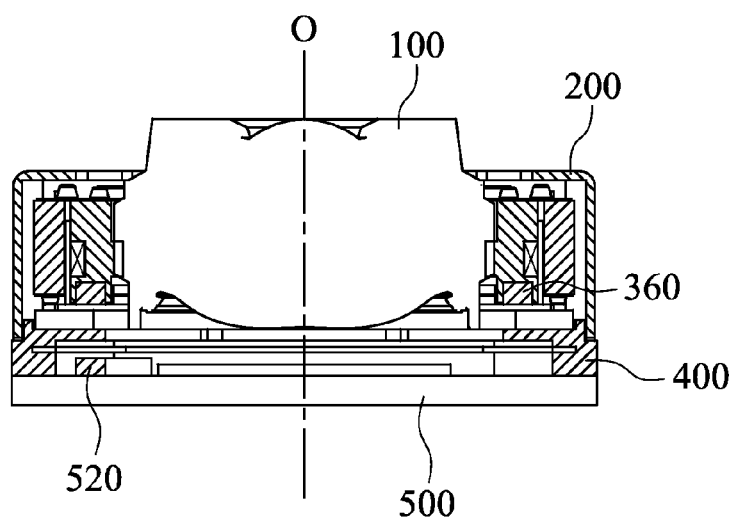
FIG. 5 is a cross-sectional view taken along line 5-5 of the lens actuating module shown in FIG. 2.

FIG. 1 is an external schematic view of a lens actuating module according to the 1st embodiment of the present disclosure. FIG. 2 is a top view of the lens actuating module shown in FIG. 1. FIG. 3 is an exploded view of the lens actuating module shown in FIG. 1. FIG. 4 is a cross-sectional view taken along line 4-4 of the lens actuating module shown in FIG. 2. FIG. 5 is a cross-sectional view taken along line 5-5 of the lens actuating module shown in FIG. 2. The lens actuating module includes a lens 100, a cover 200, a lens actuator 300, a holder 400 and a circuit board 500, wherein the cover 200 is coupled to the holder 400 so as to form an accommodating space. An end of the lens 100 is disposed in the accommodating space, and the other end of the lens 100 protrudes to an outside of the cover 200. The lens actuator 300 coupled to the lens 100 is disposed in the accommodating space. The circuit board 500 is connected with the holder 400. As shown in FIG. 1, by coupling the cover 200 to the holder 400, the cover 200 encloses the lens actuator 300 and forms a protection thereto.

Specifically, the lens 100 includes an optical axis O. The cover 200 includes a through hole 210 which allows the lens 100 to insert therethrough. The cover 200 is made of metal material, so that a sufficient rigidity is provided, and the cover 200 can withstand a greater external force. Accordingly, a deformation of the cover 200 cannot be caused easily, and the components, such as the lens actuator 300, disposed therein can be well protected. Furthermore, the cover 200 can be made of non-ferromagnetic metal material. Therefore, external electromagnetic forces can be blocked, and the stability of the lens actuating module can be enhanced.

The holder 400 includes an opening hole 410, at least three first connecting portions 420, and can selectively include at least four metal terminals 430. The through hole 210 of the cover 200 is correspondent to the opening hole 410 of the holder 400, which is favorable for the lens 100 to move along the optical axis O. In the embodiment, the holder 400 includes four first connecting portions 420 made of metal material. The first connecting portions 420 are disposed around the opening hole 410 and separated with each other. The metal terminals 430 are separated with each other and disposed on a side of the holder 400 facing the circuit board 500, i.e., the metal terminals 430 are disposed on the side of the holder 400 away from the cover 200. The metal terminals 430 are electrically connected with the circuit board 500, so that a number of the components can be reduced, and the compact size of the lens actuating module can be maintained.

The lens actuator 300 is movably disposed in the cover 200. The lens actuator 300 includes at least one elastic member 310, a frame 320, a first magnet set 330, a first coil 340, a carrier 350, a second magnet set 360, four suspension wires 370, an elastic element 380 and four second coils 390. The elastic member 310 is connected with a side of the frame 320 and a side of the carrier 350, respectively. The first magnet set 330 is disposed inside the frame 320 and disposed around the first coil 340. The first coil 340 is disposed around the carrier 350. The second magnet set 360 is disposed on the other side of the carrier 350 facing the holder 400. An end of each of the suspension wires 370 is fixedly connected with the elastic member 310, and the other end of each of the suspension wires 370 is fixedly connected with the holder 400. The elastic element 380 is coupled to the side of the carrier 350 facing the holder 400. The second coils 390 are disposed adjacent to a side of the first magnet set 330 facing the holder 400.

More specifically, the elastic member 310 is disposed around the lens 100 and includes at least three second connecting portions 312. The elastic member 310 is two spring pieces 311a and 311b separated with each other. As shown in FIG. 4, the spring piece 311a and the spring piece 311b are disposed on the same plane. Therefore, the complexity of mechanism can be reduced. Each of the spring piece 311a and the spring piece 311b has two second connecting portions 312. That is, the elastic member 310 has a total of four second connecting portions 312. The second connecting portions 312 are correspondent to the first connecting portions 420 of the holder 400. In the 1st embodiment, the second connecting portions 312 are integrated with the spring piece 311a and the spring piece 311b, respectively. In other words, the second connecting portions 312 are integrated with the elastic member 310. Therefore, the manufacturing convenience of the elastic member 310 can be enhanced.

The first magnet set 330 includes four first magnets 331 separated with each other. The first magnets 331 are movably disposed in the cover 200 and correspondent to four corners of the cover 200. Each of the first magnets 331 includes at least one first surface 331a (shown in FIG. 4) parallel to the optical axis O and at least one second surface 331b (shown in FIG. 4) orthogonal to the optical axis O. The first surface 331a is correspondent to the first coil 340, and the second surface 331b is correspondent to the second coils 390. A number of the first magnets 331 is not limited to four.

The carrier 350 is coupled to the lens 100, and can drive the lens 100 to move along the optical axis O, so that the lens actuating module is featured with the lens focus function.

The second magnet set 360 includes two second magnets 361 separated with each other. The second magnets 361 are symmetrically disposed on the side of the carrier 350 facing the holder 400, and a number of the second magnets 361 is not limited to two.

A number of the suspension wires 370 is at least three. In the 1st embodiment, the number of the suspension wires 370 is four. The suspension wires 370 are made of metal material, so that an excellent rigidity and conductivity can be provided. A longitudinal direction Z of each of the suspension wires 370 is parallel to the optical axis O. The end of each of the suspension wires 370 is fixedly connected with one of the first connecting portions 420, and the other end of each of the suspension wires 370 is fixedly connected with one of the second connecting portions 312. Therefore, a degree of freedom along a direction orthogonal to the optical axis O is provided to the lens actuator 300. The aforementioned term "fixedly connected" refers that the two ends of the suspension wire 370 are fixed to the first connecting portion 420 and the second connecting portion 312, respectively. The method for fixing the two ends of the suspension wire 370 to the first connecting portion 420 and the second connecting portion 312 can be, but not limited to, welding.

More than 95% of each of the suspension wires 370 along the longitudinal direction Z has a rectangular cross-section A (shown in FIG. 6A), and the rectangular cross-section A is orthogonal to the optical axis O. In other words, the suspension wire 370 is substantially a rectangular column. Therefore, during an automated assembly process, a contact area between the suspension wire 370 and an automatic equipment (not shown) can be enhanced, and a probability of the suspension wire 370 slipping away from the automatic equipment can be reduced. Furthermore, an assembling height of the suspension wires 370 can be favorably controlled, and the problem of module tilt of the finished assembly can be reduced. Accordingly, the assembling yield rate of the lens actuating module can be enhanced. The aforementioned term "rectangular cross-section" refers to a shape with four sides, each of the four sides is a straight line, and an angle between any two adjacent sides is 90 degrees. In other words, the "rectangular cross-section" can be an oblong (lengths of the two adjacent sides are different) or a square (lengths of the two adjacent sides are identical). When the rectangular cross-section A is square, it is favorable for the optimization of the lens actuating module.

A number of the second coils 390 is four. The second coils 390 are deposed on the holder 400 and separated with each other, and are adjacent to the second surface 331b (shown in FIG. 4) of the first magnet 331 facing the holder 400. The number of the second coils 390 is not limited to four. Furthermore, the number of the second coils 390 can be equal to or different from that of the first magnets 331.

The circuit board 500 can include an imaging element 510, a first sensor 520 and a second sensor 530. In the 1st embodiment, a number of the second sensors 530 is two. The imaging element 510 is for receiving an imaging light of the lens 100.

The first sensor 520 is for detecting a change of the magnetic field of the second magnet set 360, and the first sensor 520 can be a Hall sensor. The second sensors 530 are for detecting a change of the magnetic field of the first magnet set 330, and the second sensors 530 can be Hall sensors. Therefore, the resolution of shake detecting can be increased.

The lens actuating module can further include a source of electromagnetic force. The source of electromagnetic force can respectively interact with the first coil 340 carrying a current and the second coils 390 carrying a current so as to generate electromagnetic forces, which provides the lens actuating module the lens focus function and the optical image stabilization function. Therefore, the complexity of mechanism of the lens actuating module can be reduced. In the 1st embodiment, a number of the source of electromagnetic force is one, and the source of electromagnetic force is the first magnet set 330. In other words, the electromagnetic forces needed for the lens focus function and the optical image stabilization function can be provided by the same source of electromagnetic force, and different sources of electromagnetic force respectively corresponding to the lens focus function and the optical image stabilization function are not required. Therefore, the compact size of the lens actuating module can be maintained. How the lens actuating module according to the 1st embodiment achieves the lens focus function and the optical image stabilization function is described in detail as follows.

In a focusing process, an electronic signal is firstly obtained by the lens actuating module according to lights entering into the lens 100. The electronic signal is then sent to an electronic driver (not shown), and the electronic driver provides a current to the first coil 340. An electromagnetic force generated by the interaction of the first magnet set 330 and the first coil 340 drives the carrier 350 driving the lens 100 to move along the optical axis O, so that the lens focus function can be achieved. During the movement of the lens 100, the second magnet set 360 is driven by the carrier 350 to move along the optical axis O. As a result, a change of the magnetic field between the second magnet set 360 and the first sensor 520 is generated, and the change of the magnetic field is detected by the first sensor 520. The first sensor 520 provides an electronic signal correspondent to the position of the lens 100 to the electronic driver (not shown), so that the electronic driver can adjust the current provided to the first coil 340, which allows the lens 100 to move to a predetermined position without moving back to an initial position thereof. Accordingly, the focusing time can be significantly shortened.

In the above focusing process, when the lens 100 is driven by the carrier 350, a degree of freedom along the optical axis O of the lens 100 and the carrier 350 is provided by the elastic member 310 and the elastic element 380. The elastic member 310 and the elastic element 380 are deformed as the carrier 350 moves, and provide a restoring force to the carrier 350 when the carrier 350 moves back to an initial position thereof.

In an optical image stabilizing process, when a user uses the lens actuating module for capturing an image, an offset along a direction orthogonal to the optical axis O of the first magnet set 330 and the lens 100 may be caused by a shake, such as a hand tremor, and a change of the magnetic field between the first magnet set 330 and the second sensors 530 is generated thereby. The second sensors 530 detect the change of the magnetic field and provide an electronic signal correspondent to the offset to an electronic driver, and the electronic driver adjusts a current provided to the second coils 390, whereby an electromagnetic force generated by the interaction of the first magnet set 330 and the second coils 390 drives the first magnet set 330 and the lens 100 to move, so that another offset along another direction orthogonal to the optical axis O is generated, and the original offset can be compensated. Therefore, the image can be stabilized, and the problem results from the hand tremor can be resolved. The electronic driver used in the focusing process and the electronic driver used in the optical image stabilizing process can be identical or different.

Figure 6A:
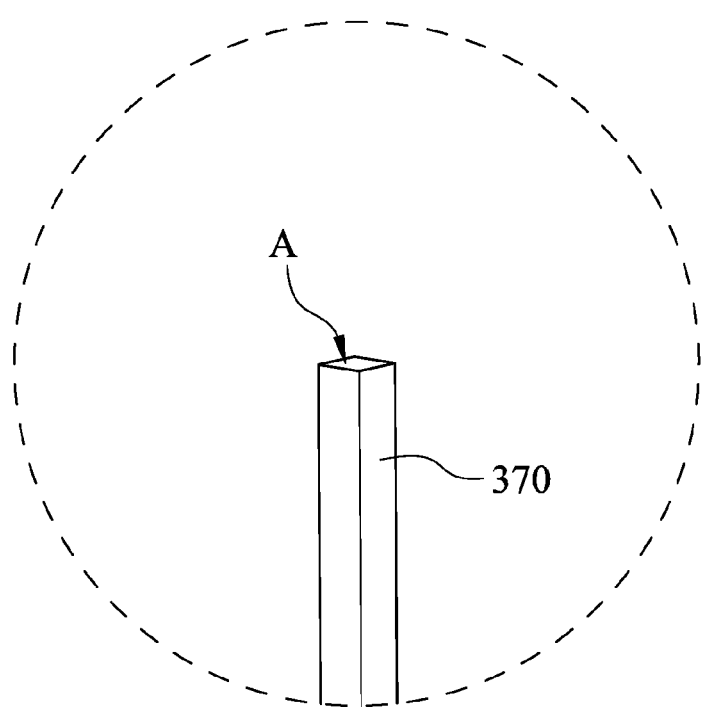
FIG. 6A is an enlarged view of a portion a' shown in FIG. 3.
Figure 6B:
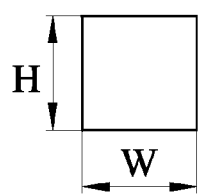
FIG. 6B is a schematic view showing the parameters W and H of the lens actuating module shown in FIG. 1.

FIG. 6A is an enlarged view of a portion a' shown in FIG. 3. FIG. 6B is a schematic view showing the parameters W and H of the lens actuating module shown in FIG. 1, and FIG. 6B is a top view of the rectangular cross-section A shown in FIG. 6A. In FIG. 6B, when a width of the rectangular cross-section A is W, and a length of the rectangular cross-section A is H, the following relationship is satisfied: 0.54<W/H<1.85. Therefore, the entire uniformity of the suspension wires 370 can be maintained and the manufacturing convenience can be enhanced. Furthermore, an excessive difference of the elasticity of the suspension wires 370 can be avoided, and the consistency of the movement along the direction orthogonal to the optical axis O of the lens 100 can be enhanced. Preferably, the following relationship can be satisfied: 0.65<W/H<1.55. Therefore, the sensitivity of the lens actuating module can be further enhanced. The aforementioned term "width" refers to a length of the shortest side of the rectangular cross-section A, and the aforementioned term "length" refers to a length of the longest side of the rectangular cross-section A. In other words, when the rectangular cross-section A is an oblong, the aforementioned term "width" refers to a length of the shorter side of the rectangular cross-section A, and when the rectangular cross-section A is a square, the aforementioned term "width" refers to a length of any side of the rectangular cross-section A.

In FIG. 6B, when the width of the rectangular cross-section A is W, and the length of the rectangular cross-section A is H, the following relationship can be satisfied: 0.015 mm<(W+H)/2<0.07 mm. Therefore, the required accuracy of the lens actuating module can be provided.

Figure 6C:
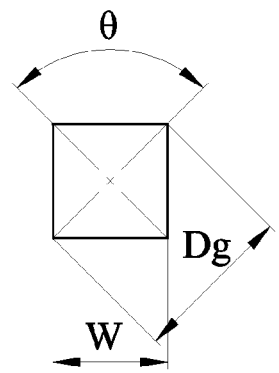
FIG. 6C is a schematic view showing the parameters W, θ and Dg of the lens actuating module shown in FIG. 1.

FIG. 6C is a schematic view showing the parameters W, θ and Dg of the lens actuating module shown in FIG. 1, and FIG. 6C is the top view of the rectangular cross-section A shown in FIG. 6A. In FIG. 6C, when a minimum angle between two diagonals of the rectangular cross-section A is θ, the following relationship can be satisfied: 55 degrees<θ≤90 degrees. Therefore, the suspension wires 370 are more durable, and the reliability thereof can be enhanced.

In FIG. 6C, when a length of the diagonal of the rectangular cross-section A is Dg, and the width of the rectangular cross-section A is W, the following relationship can be satisfied: 1.3<Dg/W<2.1. Therefore, the suspension wires 370 are more durable, and the lifetime thereof can be prolonged.

Figure 7:
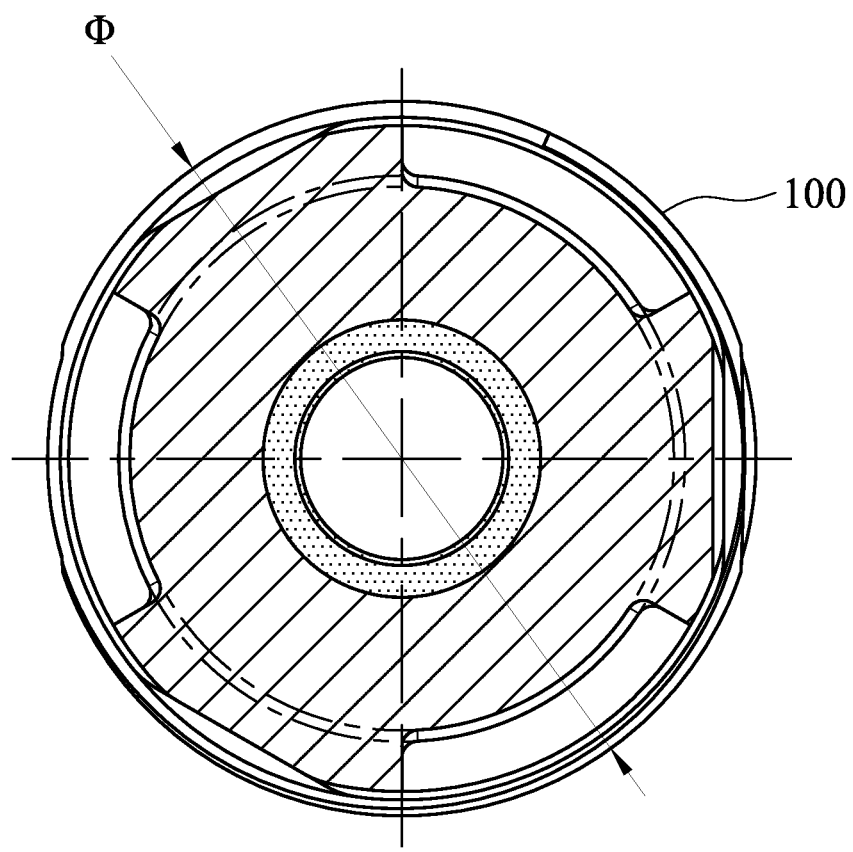
FIG. 7 is a schematic view showing the parameter φ of the lens actuating module shown in FIG. 1.

FIG. 7 is a schematic view showing the parameter φ of the lens actuating module shown in FIG. 1, and FIG. 7 is a top view of the lens 100 shown in FIG. 3. In FIG. 7, when an outermost diameter of the lens 100 is φ, the following relationship can be satisfied: 5.8 mm<φ<10.5 mm. Therefore, the required image resolution of the lens actuating module can be provided.

Figure 8A:
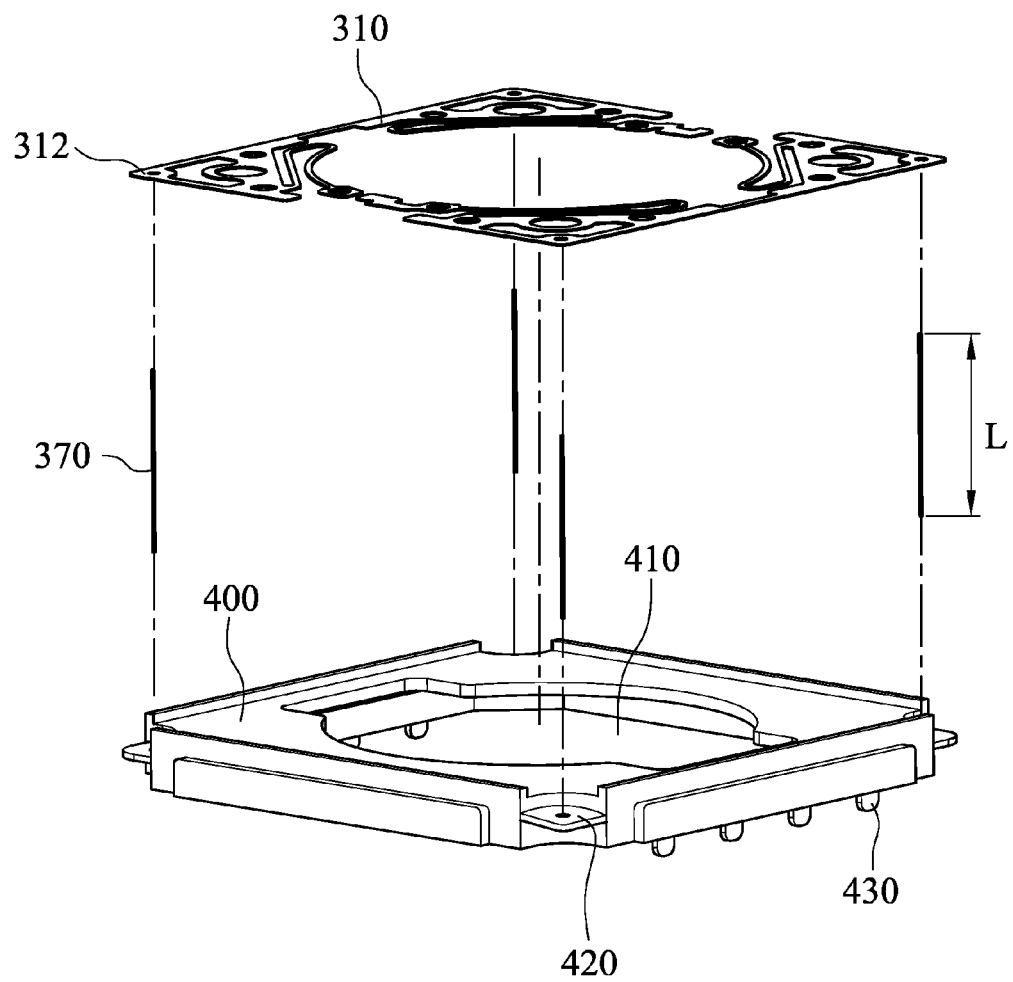
FIG. 8A is an exploded view of an elastic member, suspension wires and a holder of the lens actuating module shown in FIG. 1.
Figure 8B:
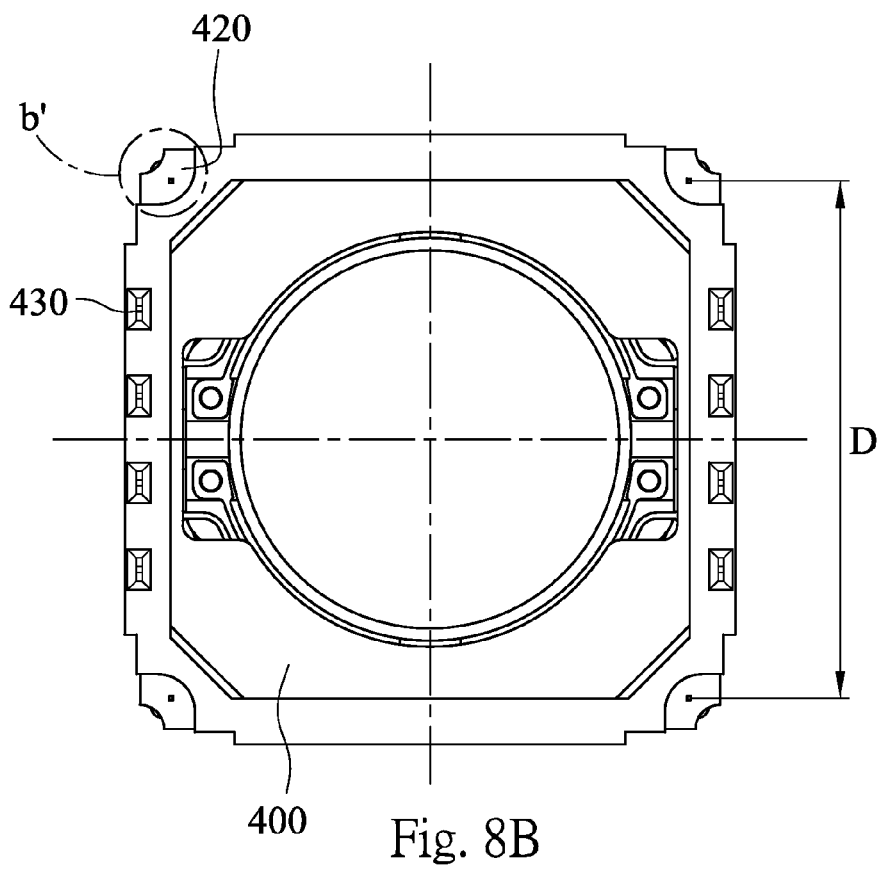
FIG. 8B is a combination bottom view of the elastic member, the suspension wires and the holder shown in FIG. 8A.
Figure 8C:
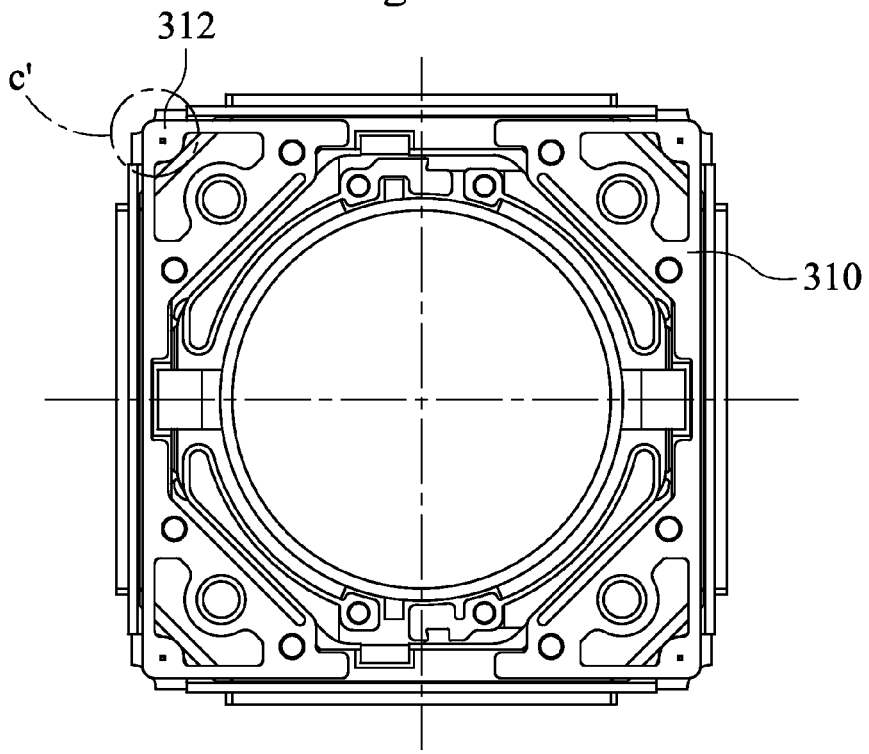
FIG. 8C is a combination top view of the elastic member, the suspension wires and the holder shown in FIG. 8A.

FIG. 8A is an exploded view of the elastic member 310, the suspension wires 370 and the holder 400 of the lens actuating module shown in FIG. 1. FIG. 8B is a combination bottom view of the elastic member 310, the suspension wires 370 and the holder 400 shown in FIG. 8A. FIG. 8C is a combination top view of the elastic member 310, the suspension wires 370 and the holder 400 shown in FIG. 8A. The other components of the lens actuating module are omitted in FIG. 8A, FIG. 8B and FIG. 8C. When a length of each of the suspension wires 370 is L (shown in FIG. 8A), and a shortest distance between each of the suspension wires 370 and another closest suspension wire 370 is D (shown in FIG. 8B), the following relationship can be satisfied: 0.15<L/D<0.55. Therefore, the required accuracy of the lens actuating module can be provided.

in FIG. 8B, when the shortest distance between each of the suspension wires 370 and another closest suspension wire 370 is D (shown in FIG. 8B), the following relationship can be satisfied: 6.2 mm<D<12.0 mm. Therefore, the compact size of the lens actuating module can be maintained.

In the 1st embodiment of the present disclosure, the width of the rectangular cross-section A (W), the length of the rectangular cross-section A (H), the value of W/H, the value of (W+H)/2, the length of each of the suspension wires 370 (L), the shortest distance between each of the suspension wires 370 and another closest suspension wire 370 (D), the value of L/D, the outermost diameter of the lens 100 (φ), the minimum angle between the two diagonals of the rectangular cross-section A (θ), the length of the diagonal of the rectangular cross-section A (Dg) and the value of Dg/W are listed in Table 1.

TABLE 1

| 1st embodiment | | | |
|---|---|---|---|
| W (mm) | 0.035 | L/D | 0.34 |
| H (mm) | 0.035 | φ (mm) | 6.50 |
| W/H | 1.00 | θ (deg.) | 90.0 |
| (W + H)/2 (mm) | 0.035 | Dg (mm) | 0.049 |
| L (mm) | 2.88 | Dg/W | 1.40 |
| D (mm) | 8.48 | | |

FIG. 9A is a schematic view showing the parameters W and H of a lens actuating module according to the 2nd embodiment of the present disclosure. FIG. 9B is a schematic view showing the parameters W, θ and Dg of the lens actuating module according to the 2nd embodiment of the present disclosure. The arrangement of the components in the 2nd embodiment is the same as that in the 1st embodiment, and is not repeated herein.

In the 2nd embodiment of the present disclosure, the width of the rectangular cross-section A (W), the length of the rectangular cross-section A (H), the value of W/H, the value of (W+H)/2, the length of each of the suspension wires 370 (L), the shortest distance between each of the suspension wires 370 and another closest suspension wire 370 (D), the value of L/D, the outermost diameter of the lens 100 (φ), the minimum angle between the two diagonals of the rectangular cross-section A (θ), the length of the diagonal of the rectangular cross-section A (Dg) and the value of Dg/W are listed in Table 2.

TABLE 2

| 2nd embodiment | | | |
|---|---|---|---|
| W (mm) | 0.050 | L/D | 0.31 |
| H (mm) | 0.050 | φ (mm) | 6.20 |
| W/H | 1.00 | θ (deg.) | 90.0 |
| (W + H)/2 (mm) | 0.050 | Dg (mm) | 0.071 |
| L (mm) | 3.47 | Dg/W | 1.42 |
| D (mm) | 11.20 | | |

FIG. 10A is a schematic view showing the parameters W and H of a lens actuating module according to the 3rd embodiment of the present disclosure. FIG. 10B is a schematic view showing the parameters W, θ and Dg of the lens actuating module according to the 3rd embodiment of the present disclosure. The arrangement of the components in the 3rd embodiment is the same as that in the 1st embodiment, and is not repeated herein.

In the 3rd embodiment of the present disclosure, the width of the rectangular cross-section A (W), the length of the rectangular cross-section A (H), the value of W/H, the value of (W+H)/2, the length of each of the suspension wires 370 (L), the shortest distance between each of the suspension wires 370 and another closest suspension wire 370 (D), the value of L/D, the outermost diameter of the lens 100 ($\phi$), the minimum angle between the two diagonals of the rectangular cross-section A ($\theta$), the length of the diagonal of the rectangular cross-section A (Dg) and the value of Dg/W are listed in Table 3.

TABLE 3

| 3rd embodiment | | | |
|---|---|---|---|
| W (mm) | 0.062 | L/D | 0.27 |
| H (mm) | 0.062 | $\phi$ (mm) | 6.00 |
| W/H | 1.00 | $\theta$ (deg.) | 90.0 |
| (W + H)/2 (mm) | 0.062 | Dg (mm) | 0.084 |
| L (mm) | 2.81 | Dg/W | 1.36 |
| D (mm) | 10.40 | | |

FIG. 11A is a schematic view showing the parameters W and H of a lens actuating module according to the 4th embodiment of the present disclosure. FIG. 11B is a schematic view showing the parameters W, $\theta$ and Dg of the lens actuating module according to the 4th embodiment of the present disclosure. The arrangement of the components in the 4th embodiment is the same as that in the 1st embodiment, and is not repeated herein.

In the 4th embodiment of the present disclosure, the width of the rectangular cross-section A (W), the length of the rectangular cross-section A (H), the value of W/H, the value of (W+H)/2, the length of each of the suspension wires 370 (L), the shortest distance between each of the suspension wires 370 and another closest suspension wire 370 (D), the value of L/D, the outermost diameter of the lens 100 ($\phi$), the minimum angle between the two diagonals of the rectangular cross-section A ($\theta$), the length of the diagonal of the rectangular cross-section A (Dg) and the value of Dg/W are listed in Table 4.

TABLE 4

| 4th embodiment | | | |
|---|---|---|---|
| W (mm) | 0.036 | L/D | 0.45 |
| H (mm) | 0.055 | $\phi$ (mm) | 8.50 |
| W/H | 0.65 | $\theta$ (deg.) | 65.7 |
| (W + H)/2 (mm) | 0.046 | Dg (mm) | 0.064 |
| L (mm) | 2.97 | Dg/W | 1.78 |
| D (mm) | 6.60 | | |

FIG. 12A is a schematic view showing the parameters W and H of a lens actuating module according to the 5th embodiment of the present disclosure. FIG. 12B is a schematic view showing the parameters W, $\theta$ and Dg of the lens actuating module according to the 5th embodiment of the present disclosure. The arrangement of the components in the 5th embodiment is the same as that in the 1st embodiment, and is not repeated herein.

In the 5th embodiment of the present disclosure, the width of the rectangular cross-section A (W), the length of the rectangular cross-section A (H), the value of W/H, the value of (W+H)/2, the length of each of the suspension wires 370 (L), the shortest distance between each of the suspension wires 370 and another closest suspension wire 370 (D), the value of L/D, the outermost diameter of the lens 100 ($\phi$), the minimum angle between the two diagonals of the rectangular cross-section A ($\theta$), the length of the diagonal of the rectangular cross-section A (Dg) and the value of Dg/W are listed in Table 5.

TABLE 5

| 5th embodiment | | | |
|---|---|---|---|
| W (mm) | 0.025 | L/D | 0.41 |
| H (mm) | 0.045 | $\phi$ (mm) | 8.00 |
| W/H | 0.56 | $\theta$ (deg.) | 58.2 |
| (W + H)/2 (mm) | 0.035 | Dg (mm) | 0.051 |
| L (mm) | 3.20 | Dg/W | 2.04 |
| D (mm) | 7.80 | | |

In FIG. 8A, FIG. 8B and FIG. 8C, at least one of each of the first connecting portions 420 and each of the second connecting portions 312 can include a penetrating hole, and one of the suspension wires 370 is disposed through the penetrating hole. Therefore, the assembling convenience can be enhanced. A shape of the penetrating hole can be, but not limited to, rectangular or circular. The shape of the penetrating hole can be changed according to actual needs.

Figure 13A:
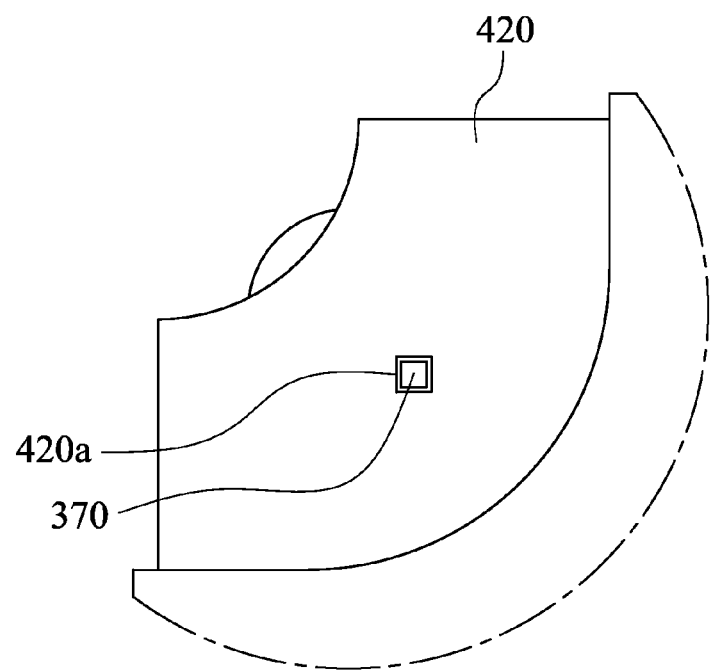
FIG. 13A is a partially enlarged view of a portion b' shown in FIG. 8B.
Figure 13B:
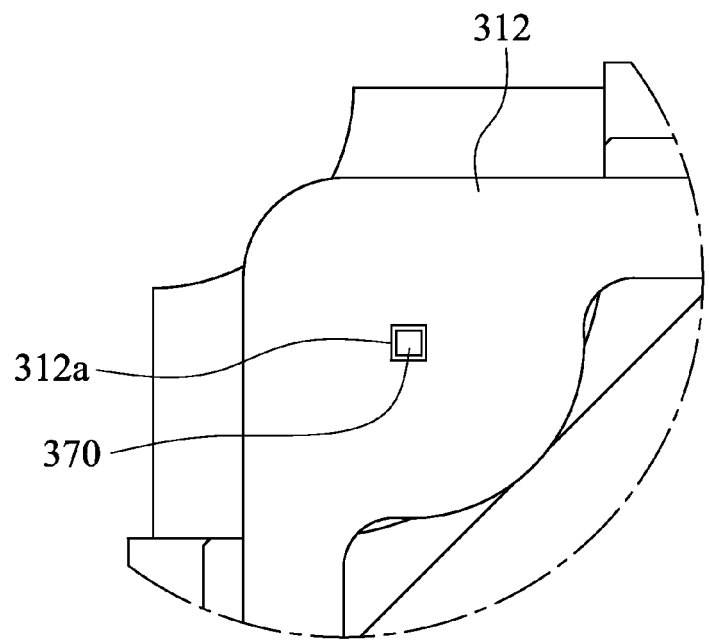
FIG. 13B is a partially enlarged view of a portion c' shown in FIG. 8C.

FIG. 13A is a partially enlarged view of a portion b' shown in FIG. 8B. FIG. 13B is a partially enlarged view of a portion c' shown in FIG. 8C. In FIG. 13A and FIG. 13B, the first connecting portion 420 includes the penetrating hole 420a, the second connecting portion 312 includes the penetrating hole 312a, and two ends of one of the suspension wires 370 are disposed through the penetrating hole 420a and the penetrating hole 312a, respectively. Therefore, the assembling convenience can be enhanced. The shape of the penetrating hole 420a and the penetrating hole 312a is rectangular. The shape of the penetrating hole (312a and 420a) is correspondent to the rectangular cross-section A (shown in FIG. 6A), and is favorable for manufacturing the penetrating hole (312a and 420a) with small size.

Figure 14A:
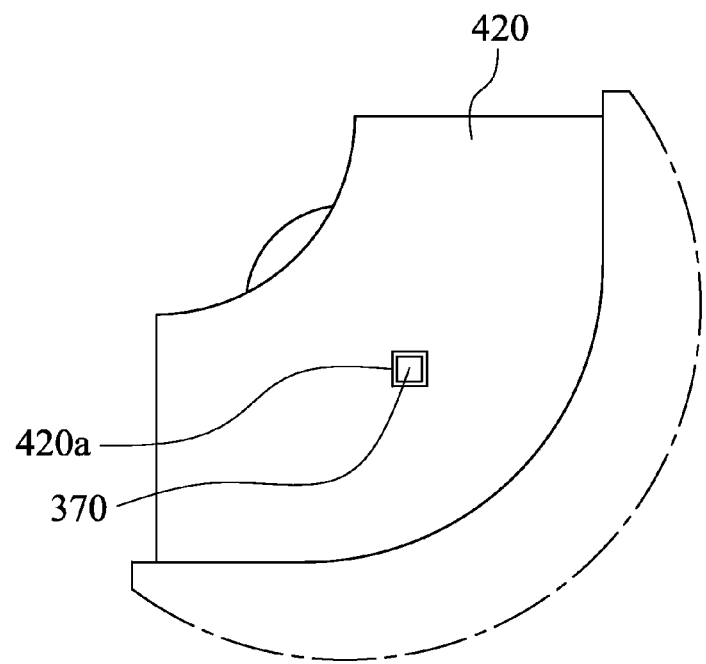
FIG. 14A is a partially enlarged view of a first connecting portion of a lens actuating module according to the 6th embodiment of the present disclosure.
Figure 14B:
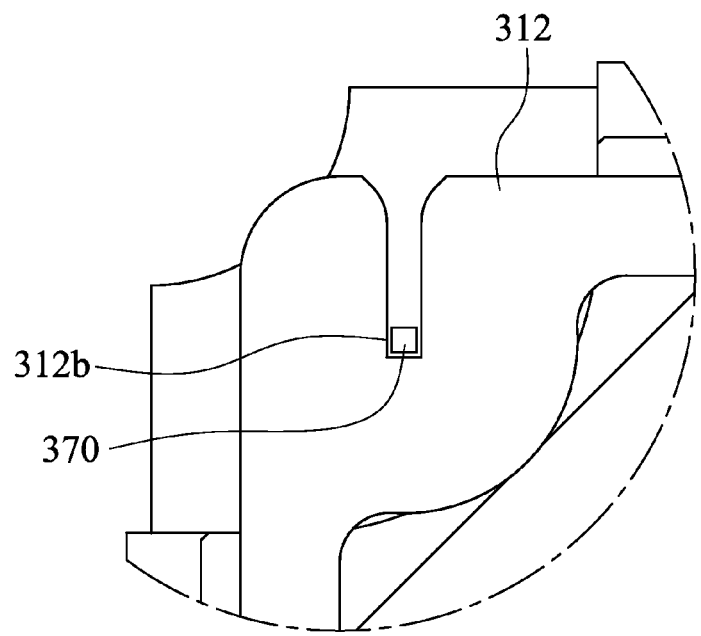
FIG. 14B is a partially enlarged view of a second connecting portion of the lens actuating module according to the 6th embodiment of the present disclosure.

FIG. 14A is a partially enlarged view of a first connecting portion 420 of a lens actuating module according to the 6th embodiment of the present disclosure. The enlarged portion of the first connecting portion 420 in FIG. 14A is the same as that shown in FIG. 13A. FIG. 14B is a partially enlarged view of a second connecting portion 312 of the lens actuating module according to the 6th embodiment of the present disclosure. The enlarged portion of the second connecting portion 312 in FIG. 14B is the same as that shown in FIG. 13B. In FIG. 14A and FIG. 14B, the first connecting portion 420 includes a penetrating hole 420a, the second connecting portion 312 includes an elongated notch 312b, and two ends of the suspension wire 370 are disposed through the penetrating hole 420a and the elongated notch 312b, respectively. Therefore, the assembling convenience can be enhanced.

Figure 15A:
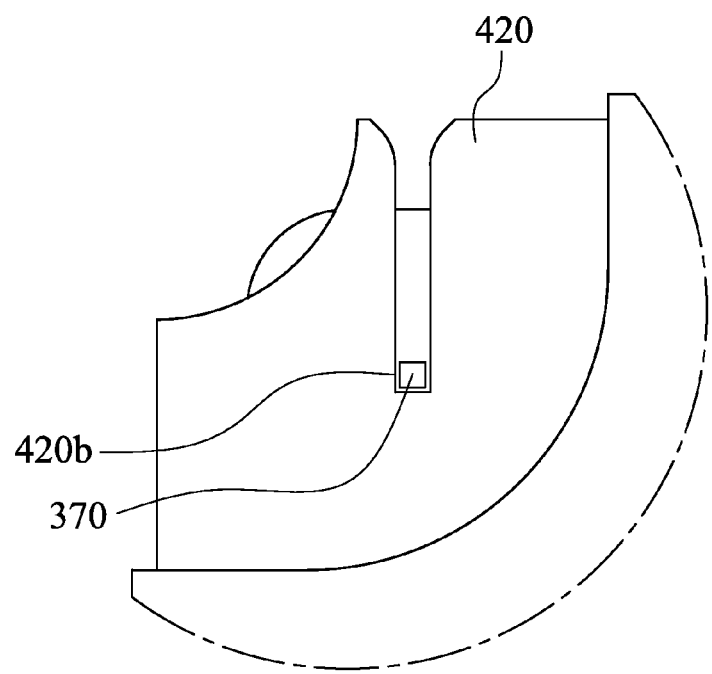
FIG. 15A is a partially enlarged view of a first connecting portion of a lens actuating module according to the 7th embodiment of the present disclosure.
Figure 15B:
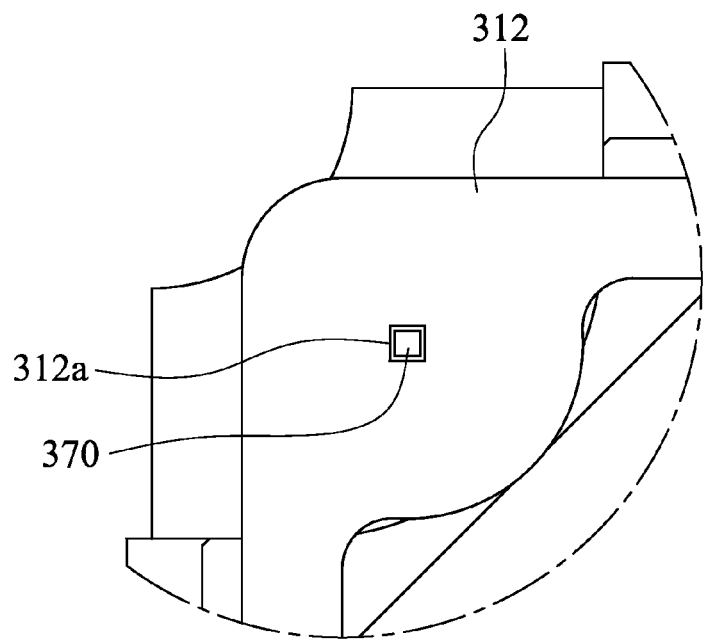
FIG. 15B is a partially enlarged view of a second connecting portion of the lens actuating module according to the 7th embodiment of the present disclosure.

FIG. 15A is a partially enlarged view of a first connecting portion 420 of a lens actuating module according to the 7th embodiment of the present disclosure. The enlarged portion of the first connecting portion 420 in FIG. 15A is the same as that shown in FIG. 13A. FIG. 15B is a partially enlarged view of a second connecting portion 312 of the lens actuating module according to the 7th embodiment of the present disclosure. The enlarged portion of the second connecting portion 312 in FIG. 15B is the same as that shown in FIG. 13B. In FIG. 15A and FIG. 15B, the first connecting portion 420 includes an elongated notch 420b, the second connecting portion 312 includes a penetrating hole 312a, and two ends of the suspension wire 370 are disposed through the elongated notch 420b and the penetrating hole 312a, respectively. Therefore, the assembling convenience can be enhanced.

Figure 16A:
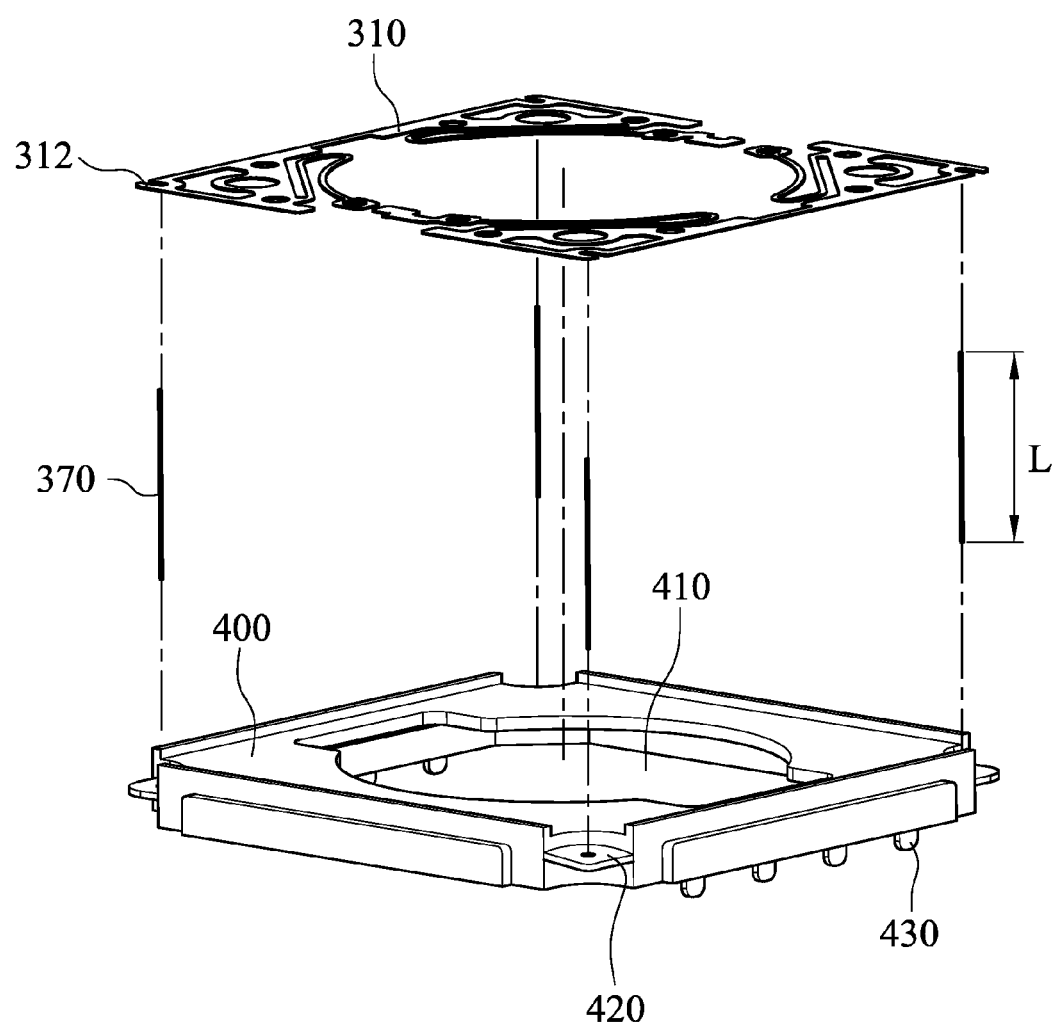
FIG. 16A is an exploded view of an elastic member, suspension wires and a holder of a lens actuating module according to the 8th embodiment of the present disclosure.
Figure 16B:
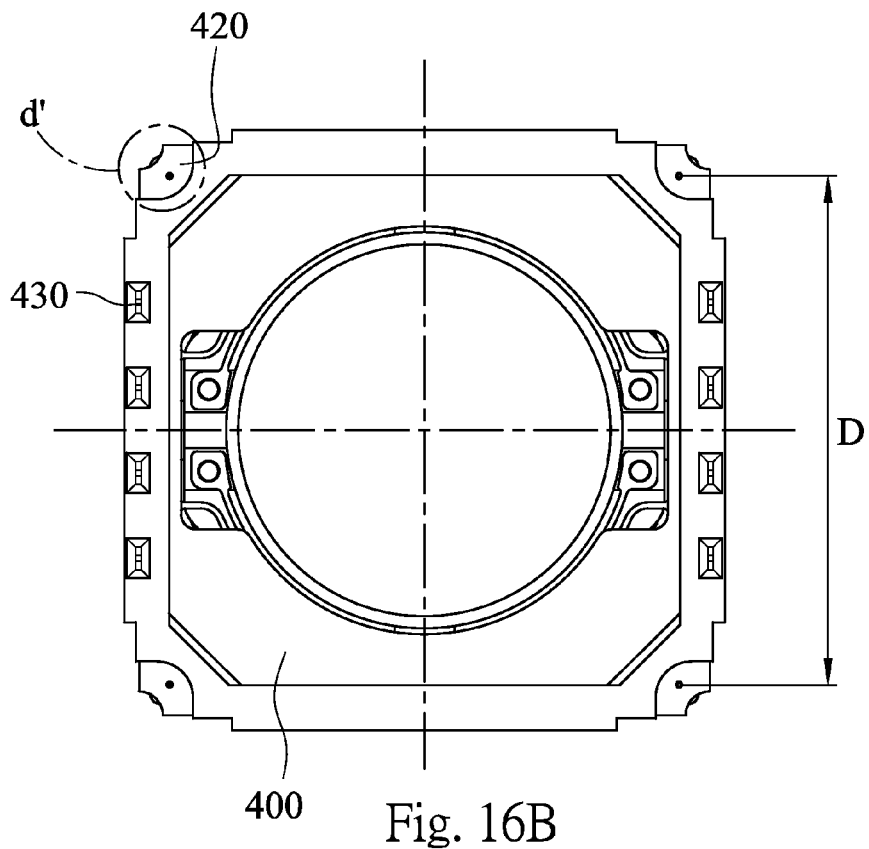
FIG. 16B is a combination bottom view of the elastic member, the suspension wires and the holder shown in FIG. 16A.
Figure 16C:
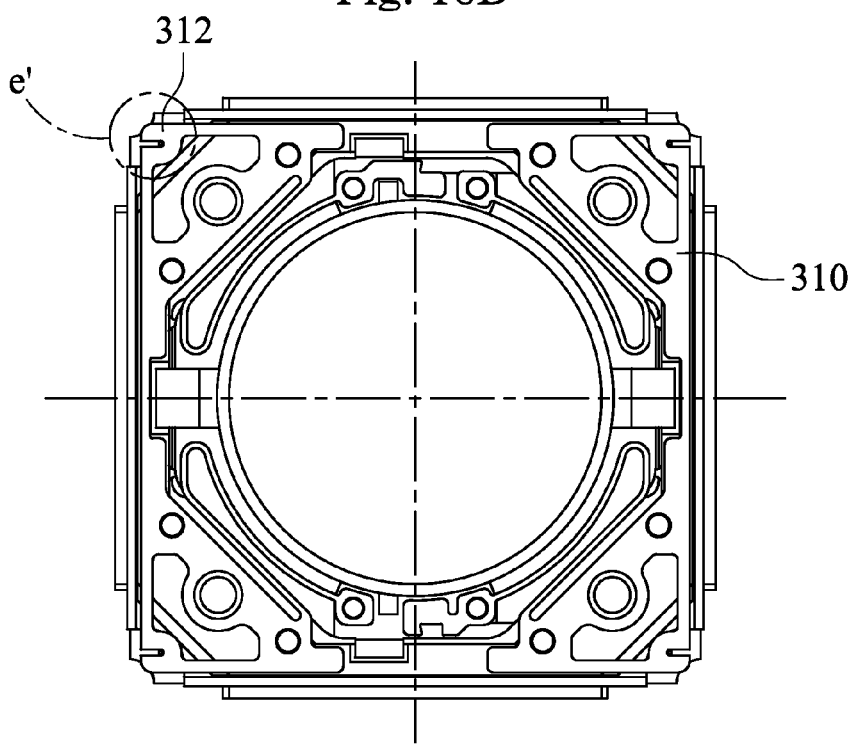
FIG. 16C is a combination top view of the elastic member, the suspension wires and the holder shown in FIG. 16A.
Figure 17A:
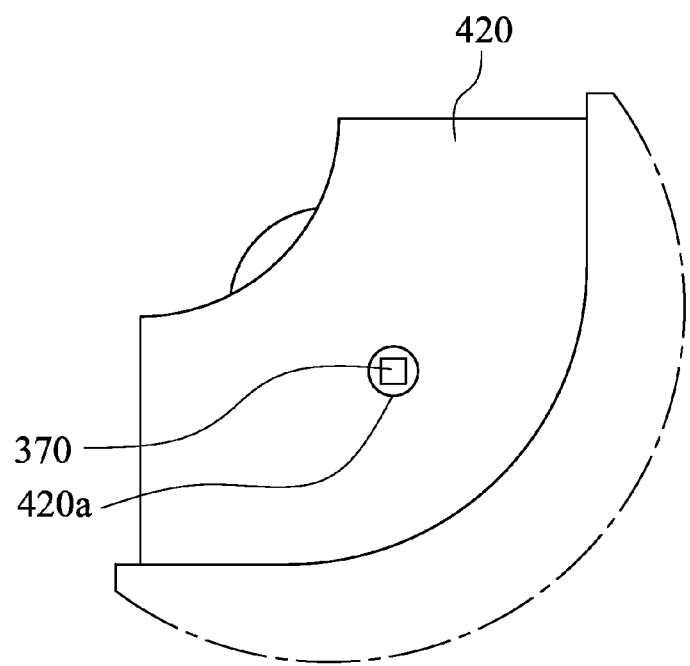
FIG. 17A is a partially enlarged view of a portion d' shown in FIG. 16B.
Figure 17B:
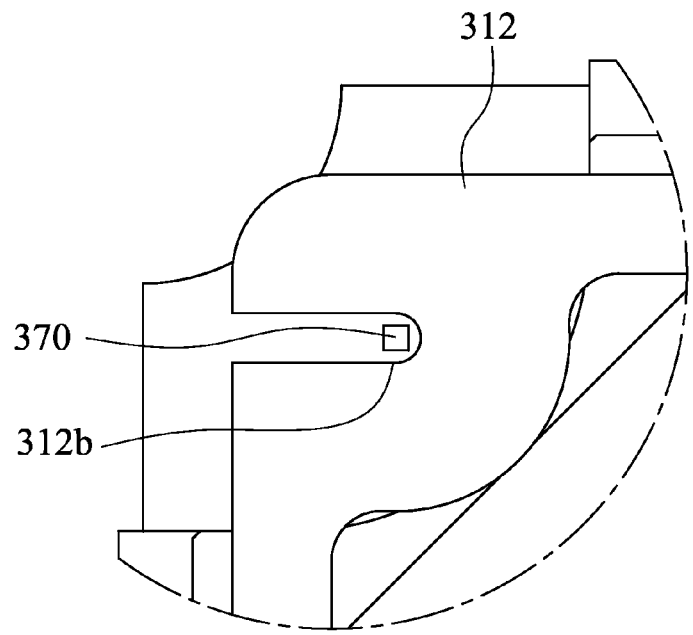
FIG. 17B is a partially enlarged view of a portion e' shown in FIG. 16C.

FIG. 16A is an exploded view of an elastic member 310, suspension wires 370 and a holder 400 of a lens actuating module according to the 8th embodiment of the present disclosure. FIG. 16B is a combination bottom view of the elastic member 310, the suspension wires 370 and the holder 400 shown in FIG. 16A. FIG. 16C is a combination top view of the elastic member 310, the suspension wires 370 and the holder 400 shown in FIG. 16A. The other components of the lens actuating module are omitted in FIG. 16A, FIG. 16B and FIG. 16C. FIG. 17A is a partially enlarged view of a portion d' shown in FIG. 16B. FIG. 17B is a partially enlarged view of a portion e' shown in FIG. 16C. In FIG. 17A and FIG. 17B, the first connecting portion 420 includes a penetrating hole 420a, the second connecting portion 312 includes an elongated notch 312b, and two ends of the suspension wire 370 are disposed through the penetrating hole 420a and the elongated notch 312b, respectively. Therefore, the assembling convenience can be enhanced. Furthermore, a shape of the penetrating hole 420a is circular, and a closed end of the elongated notch 312b is round. Therefore, it is favorable for manufacturing the penetrating hole 420a and the elongated notch 312b, and the yield rate can be enhanced.

Figure 18A:
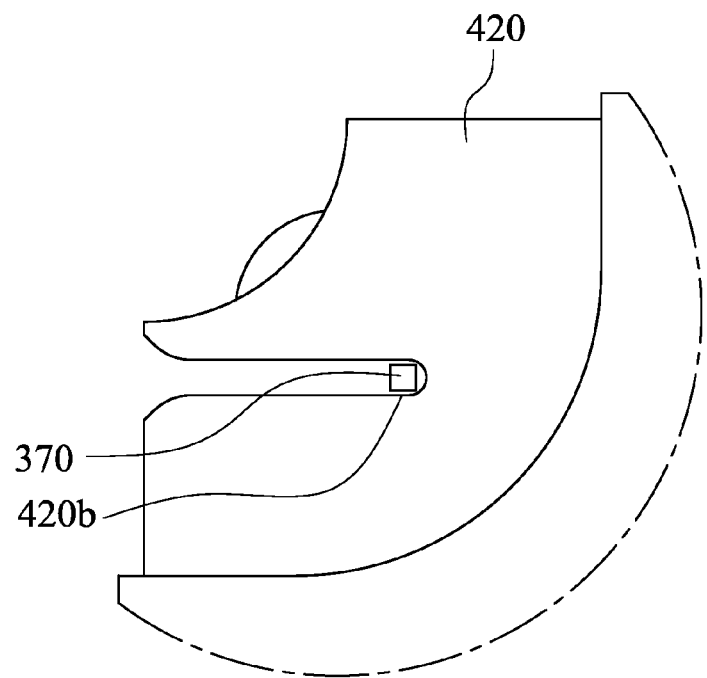
FIG. 18A is a partially enlarged view of a first connecting portion of a lens actuating module according to the 9th embodiment of the present disclosure.
Figure 18B:
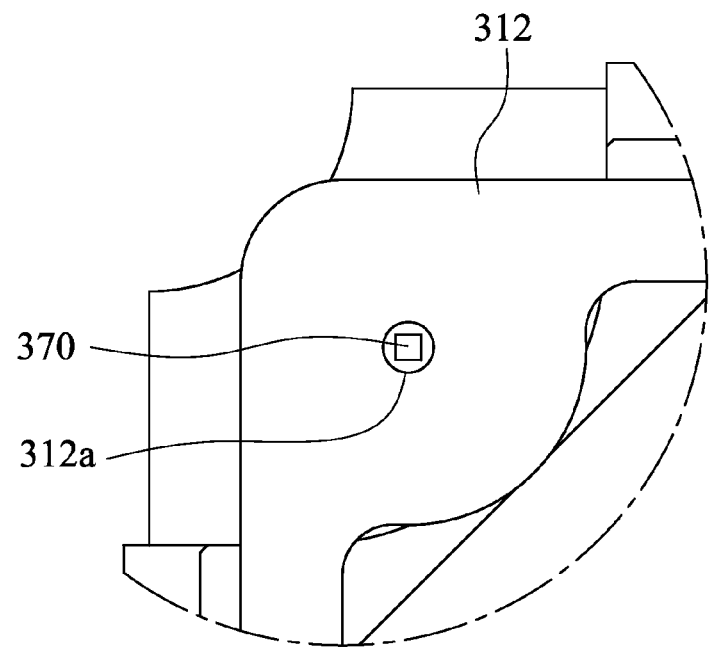
FIG. 18B is a partially enlarged view of a second connecting portion of the lens actuating module according to the 9th embodiment of the present disclosure.

FIG. 18A is a partially enlarged view of a first connecting portion 420 of a lens actuating module according to the 9th embodiment of the present disclosure. The enlarged portion of the first connecting portion 420 in FIG. 18A is the same as that shown in FIG. 17A. FIG. 18B is a partially enlarged view of a second connecting portion 312 of the lens actuating module according to the 9th embodiment of the present disclosure. The enlarged portion of the second connecting portion 312 in FIG. 18B is the same as that shown in FIG. 17B. In FIG. 18A and FIG. 18B, the first connecting portion 420 includes an elongated notch 420b, the second connecting portion 312 includes a penetrating hole 312a, and two ends of the suspension wire 370 are disposed through the elongated notch 420b and the penetrating hole 312a, respectively. Therefore, the assembling convenience can be enhanced. Furthermore, a closed end of the elongated notch 420b is round, and a shape of the penetrating hole 312a is circular.

Figure 19:
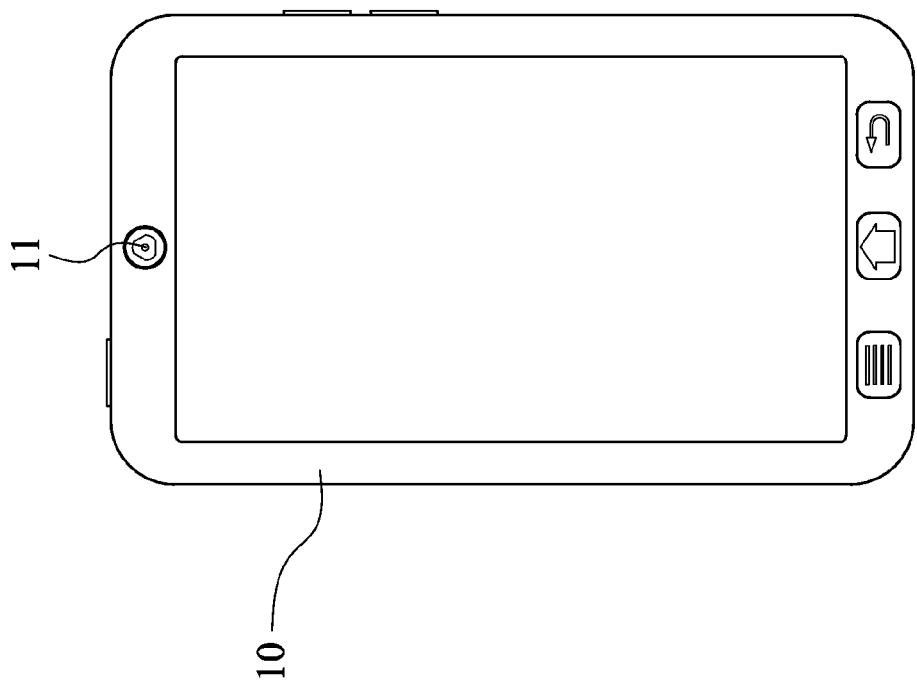
FIG. 19 is a schematic view of an electronic device according to the 10th embodiment of the present disclosure.

FIG. 19 is a schematic view of an electronic device 10 according to the 10th embodiment of the present disclosure. The electronic device 10 of the 10th embodiment is a smart phone with a communication function. The electronic device 10 includes a lens actuating module 11 according to the present disclosure.

Figure 20:
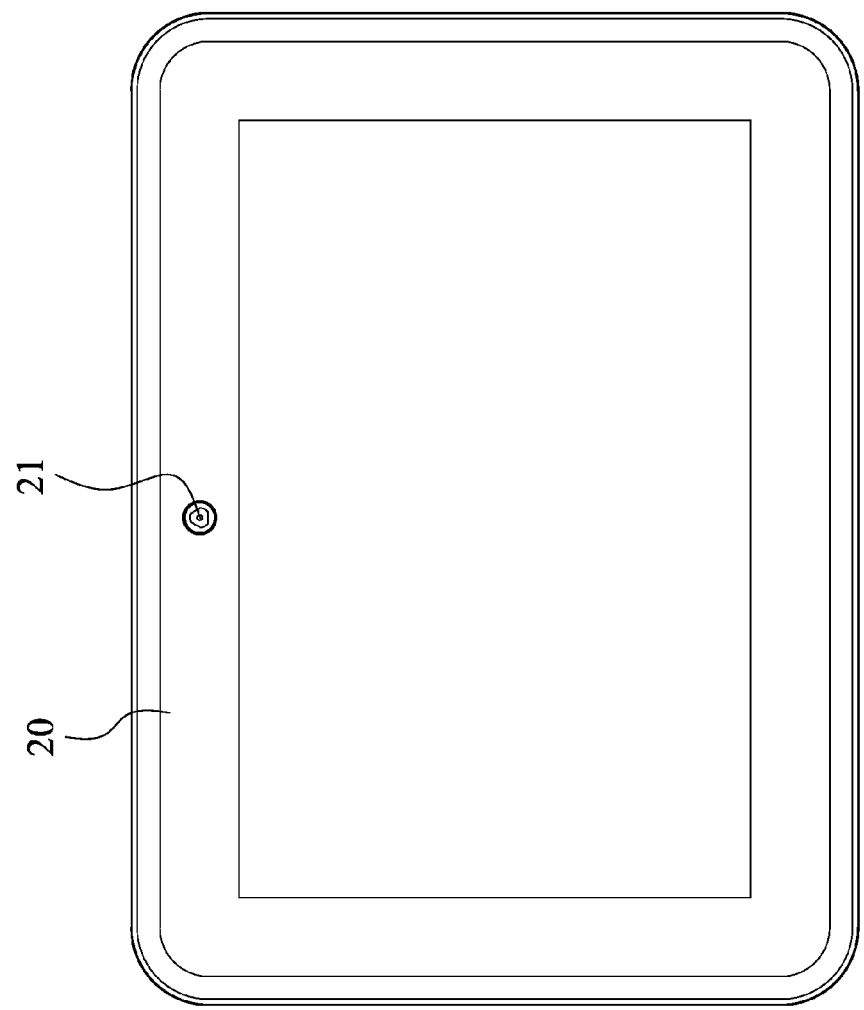
FIG. 20 is a schematic view of an electronic device according to the 11th embodiment of the present disclosure.

FIG. 20 is a schematic view of an electronic device 20 according to the 11th embodiment of the present disclosure. The electronic device 20 of the 11th embodiment is a tablet personal computer with a communication function. The electronic device 20 includes a lens actuating module 21 according to the present disclosure.

Figure 21:
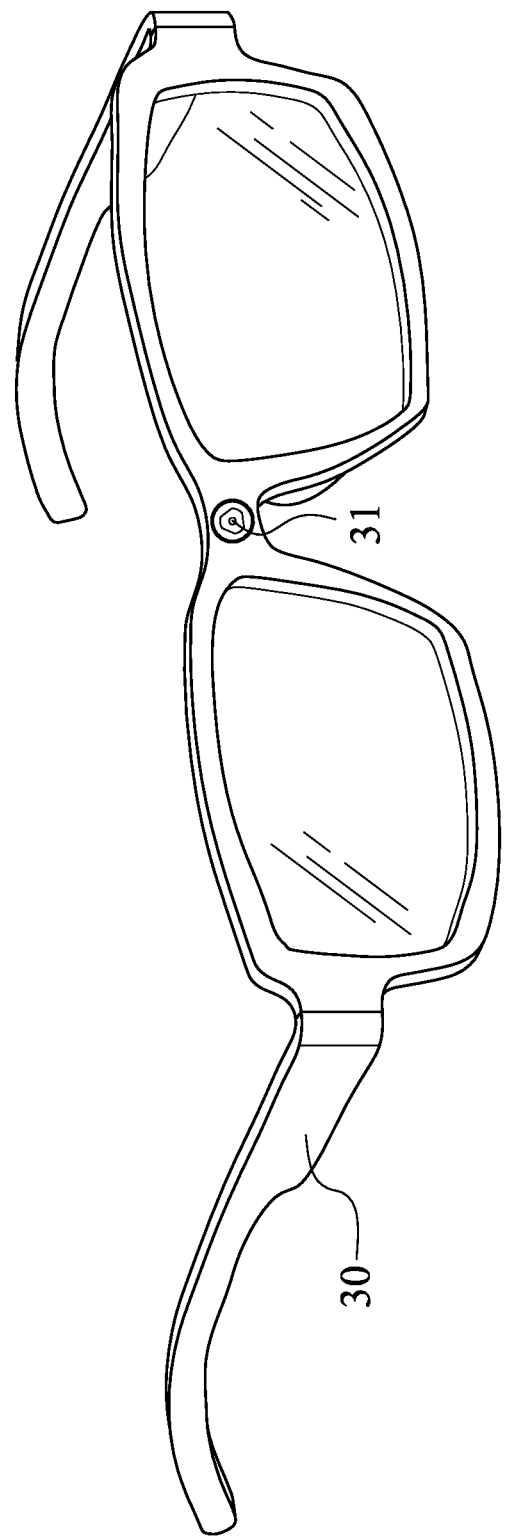
FIG. 21 is a schematic view of an electronic device according to the 12th embodiment of the present disclosure.

FIG. 21 is a schematic view of an electronic device 30 according to the 12th embodiment of the present disclosure. The electronic device 30 of the 12th embodiment is a head-mounted display with a communication function. The electronic device 30 includes a lens actuating module 31 according to the present disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lens actuating module, comprising:
a holder, comprising:
an opening hole; and
at least three first connecting portions made of metal material, wherein the first connecting portions are disposed around the opening hole and separated with each other;
a cover coupled to the holder, wherein the cover is made of metal material and comprises a through hole correspondent to the opening hole of the holder;
a lens with an optical axis correspondent to the through hole of the cover; and
a lens actuator movably disposed in the cover, the lens actuator comprising:
at least one elastic member disposed around the lens and comprising at least three second connecting portions; and
at least three suspension wires made of metal material, wherein a longitudinal direction of each of the suspension wires is parallel to the optical axis of the lens, an end of each of the suspension wires is fixedly connected with one of the first connecting portions, the other end of each of the suspension wires is fixedly connected with one of the second connecting portions, more than 95% of each of the suspension wires along the longitudinal direction has a rectangular cross-section, the rectangular cross-section is orthogonal to the optical axis of the lens, a width of the rectangular cross-section is W, a length of the rectangular cross-section is H, and the following relationship is satisfied:

$$0.54 < W/H < 1.85.$$

2. The lens actuating module of claim 1, wherein the second connecting portions are integrated with the elastic member.

3. The lens actuating module of claim 2, wherein at least one of each of the first connecting portions and each of the second connecting portions comprises a penetrating hole, and each of the suspension wires is disposed through the penetrating hole.

4. The lens actuating module of claim 3, wherein one of each of the first connecting portions and each of the second connecting portions comprises the penetrating hole, and the other of each of the first connecting portions and each of the second connecting portions comprises a rectangular hole or an elongated notch.

5. The lens actuating module of claim 3, wherein one of each of the first connecting portions and each of the second connecting portions comprises the penetrating hole, and the other of each of the first connecting portions and each of the second connecting portions comprises an elongated notch.

6. The lens actuating module of claim 3, wherein each of the first connecting portions and each of the second connecting portions comprise the penetrating hole.

7. The lens actuating module of claim 3, wherein the holder further comprises at least four metal terminals, and the metal terminals are disposed on a side of the holder away from the cover.

8. The lens actuating module of claim 3, wherein a length of each of the suspension wires is L, a shortest distance between each of the suspension wires and another closest suspension wire is D, and the following relationship is satisfied:

$0.15 < L/D < 0.55$.

9. The lens actuating module of claim 3, wherein the elastic member is two spring pieces separated with each other, and the spring pieces are disposed on a same plane.

10. The lens actuating module of claim 9, wherein the width of the rectangular cross-section is W, the length of the rectangular cross-section is H, and the following relationship is satisfied:

$0.015 \text{ mm} < (W+H)/2 < 0.07 \text{mm}$.

11. The lens actuating module of claim 9, wherein the rectangular cross-section is square.

12. The lens actuating module of claim 9, wherein the cover is made of non-ferromagnetic metal material.

13. The lens actuating module of claim 9, wherein a shortest distance between each of the suspension wires and another closest suspension wire is D, and the following relationship is satisfied:

$6.2 \text{ mm} < D < 12.0 \text{ mm}$.

14. The lens actuating module of claim 9, further comprising:
  a first magnet set disposed in the cover, wherein the first magnet set comprises a plurality of first magnets, and each of the first magnets comprises a first surface parallel to the optical axis and a second surface orthogonal to the optical axis.

15. The lens actuating module of claim 14, further comprising:
  a first coil correspondent to the first surface of each of the first magnets; and
  at least one second coil correspondent to the second surfaces of the first magnets.

16. The lens actuating module of claim 1, wherein the width of the rectangular cross-section is W, the length of the rectangular cross-section is H, and the following relationship is satisfied:

$0.65 < W/H < 1.55$.

17. The lens actuating module of claim 1, wherein an outermost diameter of the lens is $\Phi$, and the following relationship is satisfied:

$5.8 \text{ mm} < \phi < 10.5 \text{ mm}$.

18. The lens actuating module of claim 1, wherein a minimum angle between two diagonals of the rectangular cross-section is $\theta$, and the following relationship is satisfied:

$55 \text{ degrees} < \theta \leq 90 \text{ degrees}$.

19. The lens actuating module of claim 1, wherein a length of a diagonal of the rectangular cross-section is Dg, the width of the rectangular cross-section is W, and the following relationship is satisfied:

$1.3 < Dg/W < 2.1$.

* * * * *